US009086741B2

(12) United States Patent
Helmes et al.

(10) Patent No.: US 9,086,741 B2
(45) Date of Patent: Jul. 21, 2015

(54) USER INPUT DEVICE

(75) Inventors: John Helmes, Cambridge (GB);
Shahram Izadi, Cambridge (GB);
Xiang Cao, Beijing (CN); Nicolas Villar, Cambridge (GB); Richard Banks, Egham (GB)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 12/915,386

(22) Filed: Oct. 29, 2010

(65) Prior Publication Data

US 2012/0105312 A1    May 3, 2012

(51) Int. Cl.
*G06F 3/0346* (2013.01)
*G06F 3/01* (2006.01)
*G06F 3/023* (2006.01)
*G06F 3/0354* (2013.01)

(52) U.S. Cl.
CPC .............. *G06F 3/0346* (2013.01); *G06F 3/016* (2013.01); *G06F 3/017* (2013.01); *G06F 3/0236* (2013.01); *G06F 3/03547* (2013.01); *G06F 2203/0339* (2013.01)

(58) Field of Classification Search
CPC ....... G06F 3/016; G06F 3/017; G06F 3/0346; G06F 3/03547; G06F 3/0236; G06F 2203/0339
USPC .................................................. 345/156–184
See application file for complete search history.

(56) References Cited

U.S. PATENT DOCUMENTS

| 6,529,233 | B1 * | 3/2003 | Allen | 348/211.2 |
|---|---|---|---|---|
| 6,567,068 | B2 * | 5/2003 | Rekimoto | 345/156 |
| 6,956,564 | B1 | 10/2005 | Williams | |
| 7,042,441 | B2 | 5/2006 | Adams et al. | |
| 2005/0035942 | A1 * | 2/2005 | Ruiz | 345/156 |
| 2005/0116927 | A1 * | 6/2005 | Voelckers | 345/157 |
| 2005/0128186 | A1 | 6/2005 | Shahoian et al. | |
| 2006/0052885 | A1 * | 3/2006 | Kong | 700/84 |
| 2006/0092133 | A1 * | 5/2006 | Touma et al. | 345/158 |
| 2007/0247437 | A1 * | 10/2007 | Ku et al. | 345/173 |

(Continued)

OTHER PUBLICATIONS

Battersby, "The Nintendo Wii controller as an adaptive assistive device—a technical report", retrieved on Jul. 30, 2010 at <<http://www.ics.heacademy.ac.uk/events/presentations/670_SJBmiddlesbrough2.doc>>, HEA ICS Supporting Disabled Students through Games Workshop, Middlesbrough, UK, Feb. 2, 2008, pp. 1-11.

(Continued)

*Primary Examiner* — Charles V Hicks
*Assistant Examiner* — Charles Zheng
(74) *Attorney, Agent, or Firm* — Steve Wight; Judy Yee; Micky Minhas

(57) ABSTRACT

A user input device is described. In an embodiment the user input device is hand held and comprises a sensing strip to detect one-dimensional motion of a user's finger or thumb along the sensing strip and to detect position of a user's finger or thumb on the sensing strip. In an embodiment the sensed data is used for cursor movement and/or text input at a master device. In an example the user input device has an orientation sensor and orientation of the device influences orientation of a cursor. For example, a user may move the cursor in a straight line in the pointing direction of the cursor by sliding a finger or thumb along the sensing strip. In an example, an alphabetical scale is displayed and a user is able to zoom into the scale and select letters for text input using the sensing strip.

18 Claims, 23 Drawing Sheets

(56) References Cited

U.S. PATENT DOCUMENTS

| | | | |
|---|---|---|---|
| 2008/0024462 A1* | 1/2008 | Kim et al. | 345/174 |
| 2008/0248871 A1 | 10/2008 | Szturm et al. | |
| 2009/0066648 A1* | 3/2009 | Kerr et al. | 345/158 |
| 2009/0158203 A1* | 6/2009 | Kerr et al. | 715/784 |
| 2009/0213081 A1 | 8/2009 | Case, Jr. | |
| 2009/0256817 A1 | 10/2009 | Perlin et al. | |

OTHER PUBLICATIONS

Chipman, et al., "SlideBar: Analysis of a linear input device", retrieved on Jul. 30, 2010 at <<http://citeseerx.ist.psu.edu/viewdoc/download?doi=10.1.1.14.4878&rep=rep1&type=pdf>>, Taylor and Francis Publisher, Behaviour and Information Technology, vol. 23, No. 1, Jan.-Feb. 2004, pp. 1-10.

Froehlich, et al., "The GlobeFish and the GlobeMouse: Two New Six Degree of Freedom Input Devices for Graphics Applications", retrieved on Jul. 30, 2010 at <<http://web.uni-weimar.de/cms/fileadmin/medien/vr/documents/publications/GlobeFish.GlobeMouse_CHI2006_fullpaper.pdf>>, ACM, Proceedings of Conference on Human Factors in Computing Systems (CHI), Montreal, Canada, Apr. 2006, pp. 191-199.

"Gyration Air Mouse Elite Presenter", retrieved on Oct. 28, 2010 at <<http://www.gyration.co.uk/proddata.php?partno=E3905>>, Eurotech, 2006, pp. 1-2.

* cited by examiner

US 9,086,741 B2

USER INPUT DEVICE

BACKGROUND

Many types of user input device are known for enabling a user to control another device such as a personal computer, television, audio system, video game, or other device. For example, computer keyboards and mice are known for controlling a personal computer or other computing device and hand held video game controllers are available for video gaming. For controlling televisions, audio players and other media presentation devices, hand held remote control devices are typically used.

For making text input to a computing device typical forms of input device are keyboards, key pads, touch screens and electronic ink pens.

The embodiments described below are not limited to implementations which solve any or all of the disadvantages of known user input devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A user input device is described. In an embodiment the user input device is hand held and comprises a sensing strip to detect one-dimensional motion of a user's finger or thumb along the sensing strip and to detect position of a user's finger or thumb on the sensing strip. In an embodiment the sensed data is used for cursor movement and/or text input at a master device. In an example the user input device has an orientation sensor and orientation of the device influences orientation of a cursor. For example, a user may move the cursor in a straight line in the pointing direction of the cursor by sliding a finger or thumb along the sensing strip. In an example, an alphabetical scale is displayed and a user is able to zoom into the scale and select letters for text input using the sensing strip.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
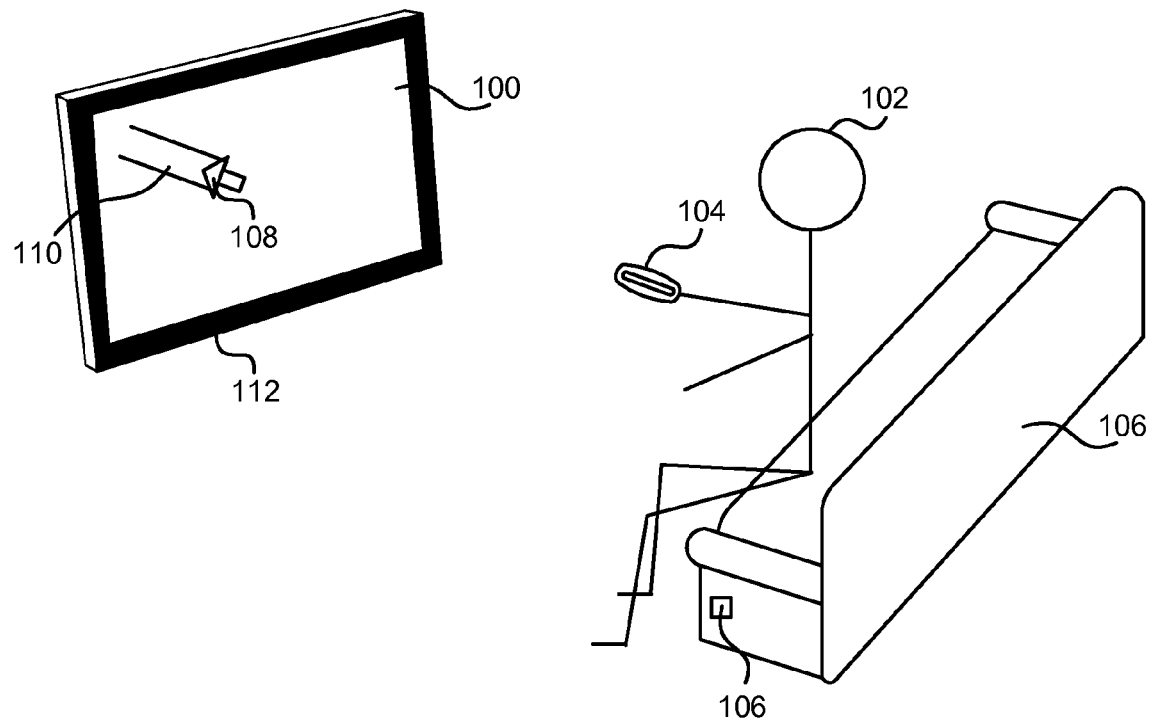
FIG. 1 is a schematic diagram of a user operating a user input device in order to control movement and position of a cursor at a master device.

FIG. 1 is a schematic diagram of a user input device 104 held by a user 102 who is sitting on a couch or sofa 106. The user input device 104 is for making user input to a master device 112 such as a computer, television, media presentation device, video conferencing device or other device with a display screen 100 for presenting a graphical user interface. A communication link between the user input device 104 and the master device 112 is provided using a wired connection or a wireless connection of any type.

The user input device 104 comprises a sensing strip (such as a capacitive strip or potentiometer strip) which is sized and shaped to allow a user's finger or thumb to slide along the surface of that strip. For example, the strip is approximately the same width as a user's finger or thumb and approximately the same length as a user's finger or thumb. The user input device 104 may also comprise at least one orientation sensor. The user input device 104 is operated by the user 102 to control the master device 112 using the graphical user interface. For example, the graphical user interface displays a cursor 108 such that the orientation of the cursor is related to the orientation of the user input device 104 and a direction beam 110 may be displayed on the graphical user interface to indicate a direction in which the cursor is moving. For example, as a user moves his or her finger or thumb along the sensing strip the cursor 108 moves along the direction beam 110. The user may be able to make selections by pressing the potentiometer strip and/or by pressing a button on the user input device which is separate from the sensing strip.

The user input device may be light weight, sized and shaped to be hand held, operable with one hand, low cost, robust and easily stored. For example, the user input device may be stored at a fixing 106 on an item of furniture. The fixing 106 may be magnetic, may be a pouch, clip or other fixing.

By providing a light weight, hand held user input device in this way a user is able to control the master device 112 in a simple and effective manner including for "mousing" and text input. A flat surface such as a desktop is not required to support the input device as is the case with a computer mouse for example. A user is able to make cursor movements and selections without the need for surface on which to operate the input device. In some embodiments the user input device may be used for text input. In contrast to a keyboard, the need for a surface on which to operate the user input device is removed making it easy to perform text input whilst sitting on a sofa or couch. It is not essential for the user to point the user input device at the master device as illustrated in FIG. 1. This improves the ease of use of the device and enables the user to sit or stand in various positions relative to the master device.

Figure 2:
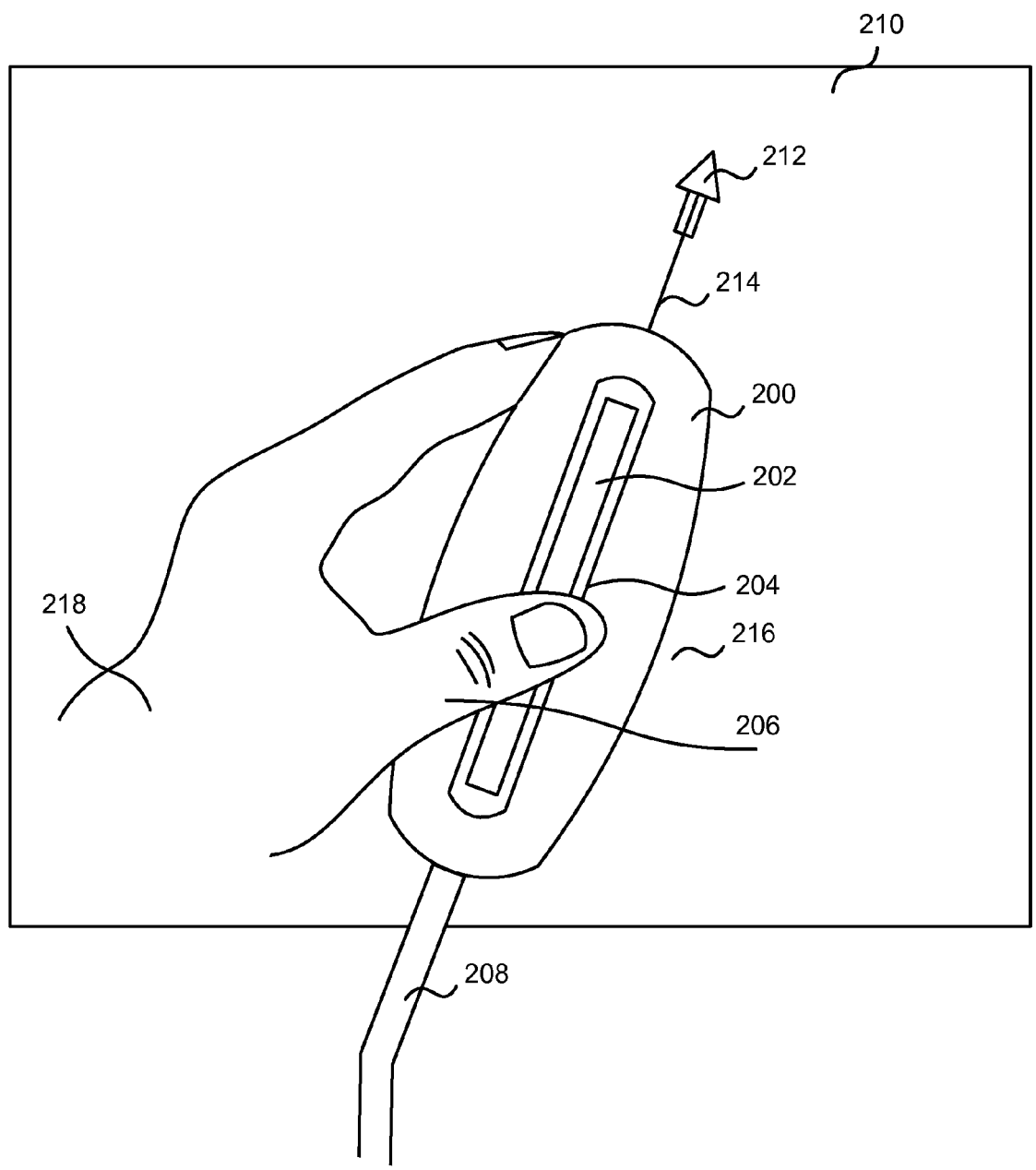
FIG. 2 shows an example user input device held in a user's hand.

FIG. 2 shows an example user input device 216 held by a user 218. A display screen 210 of a master device is shown in the background. A cursor 212 is displayed on the master device. As in FIG. 1 the orientation of the cursor is related to the orientation of the user input device 216. A direction beam 214 may additionally be displayed on the master device to indicate the direction in which the cursor is moving. The user input device comprises a housing 200 which supports a sensing strip 202. The housing may additionally provide a physical guide 204 which in an example provides tactile feedback to the user. In another example the physical guide 204 guides the user's finger or thumb along the sensing strip 200. The user input device may be connected to the master device by a wired connection 208. However, the connection to the master device may alternatively be a wireless connection. Input to the device is provided by the user's finger or thumb 206 sliding longitudinally along the surface of the sensing strip 202 or by the user lifting and placing her finger or thumb at different locations on the sensing strip. The device may be held in the user's hand 218 while in use. For example, the sensing strip is able to detect one-dimensional motion of a user's finger or thumb on the sensing strip and the position of a user's finger or thumb on the sensing strip. When the sensing strip detects the position of a user's finger or thumb on the sensing strip it detects for example, the absolute distance of the user's finger or thumb away from an end of the strip or the relative distance of the user's finger or thumb from an end of the strip.

In contrast, a computer mouse for example detects two-dimensional motion of the computer mouse on a supporting surface.

Figure 3:
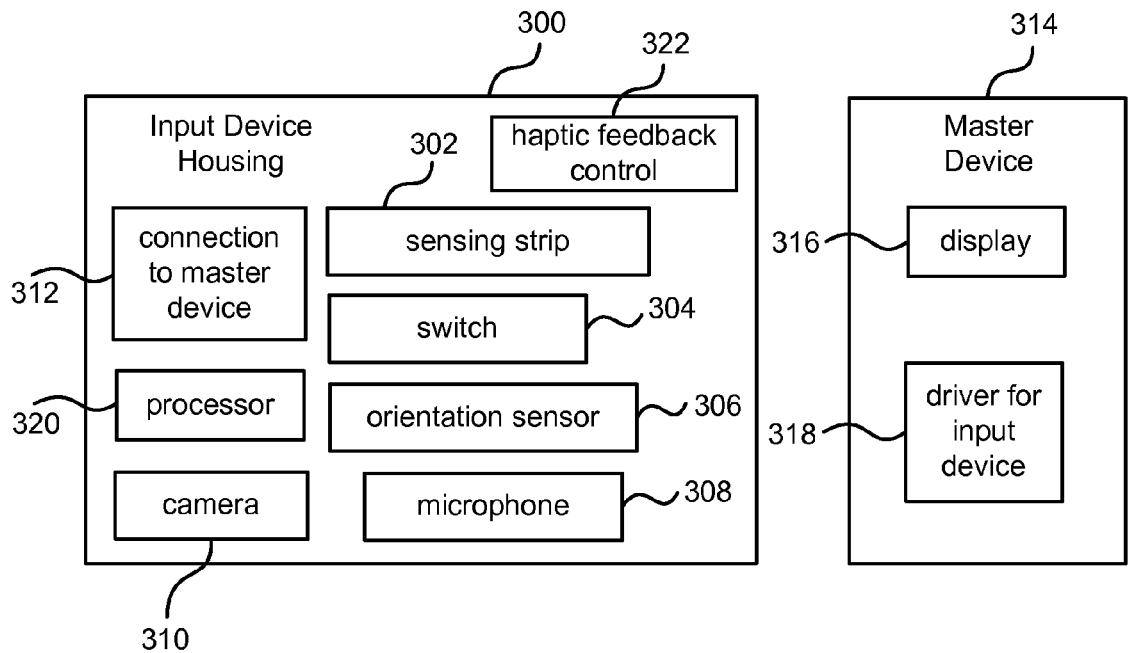
FIG. 3 is a schematic diagram of example functional components of a user input device and a master device.

FIG. 3 is a schematic diagram of a user input device 300 and master device 314. The user input device 300 comprises a housing which supports a sensing strip 302 which is arranged to receive user input. In an example this is a potentiometer strip. However the sensing strip may comprise any appropriate touch sensor. Examples of appropriate touch sensors are capacitive touch sensors, conductive touch sensors and resistive touch sensors.

In an embodiment the housing may support a switch 304 and/or an orientation sensor 306. The switch may be arranged so that when it is depressed it performs the same functions as a mouse click. Some possible switch configurations are described in more detail below. In an example the user can provide input by altering the orientation of the user input device. Using the device orientation as input provides additional degrees of freedom in operating a user interface. For example the position of a cursor can be altered by rotating the device relative to a display screen. The change in orientation can be detected by an orientation sensor. Examples of appropriate orientation sensors are an accelerometer, a gyroscope or a tilt-compensating compass. However any appropriate orientation sensor may be used.

User input device may optionally include a microphone 308 for providing sound input and/or a camera 310 for providing still image or video input. For example the user input device may be used to provide input for voice or video calls.

The user input device may optionally include a haptic feedback control 322 to provide haptic feedback to the user. In an example the sensing strip 302 is covered by a movable belt so that as the user moves their finger or thumb along the belt the sensing strip senses input and the belt also moves, giving the user a sensation of movement. In another example the user input device is arranged such that it additionally provides force feedback. For example the user input device may be arranged to vibrate when certain events occur.

A processor 320 is provided which receives data from at least the sensing strip 300. In other examples the processor may additionally receive input date from a plurality of different sensors, for example, the switch 304, the microphone 308 or the camera 310. The processor converts the received data into a digital signal which is transmitted to the master device 314 via the connection to the master device 312. The connection may be a wireless connection or a wired connection as described above.

A driver 318 for the input device may be installed on the master device 314. The driver may be arranged to receive signals from the user input device and translate the signals into a form which would be understood by the master device operating system. In an example the device driver may be additionally arranged to provide feedback from the master device to the user input device. For example in embodiments where the device comprises a haptic feedback control 322 the master device may signal the user input device to provide haptic feedback to the user. The master device additionally comprises or is connected to a display 316 on which a graphical user interface is displayed.

Figure 4:
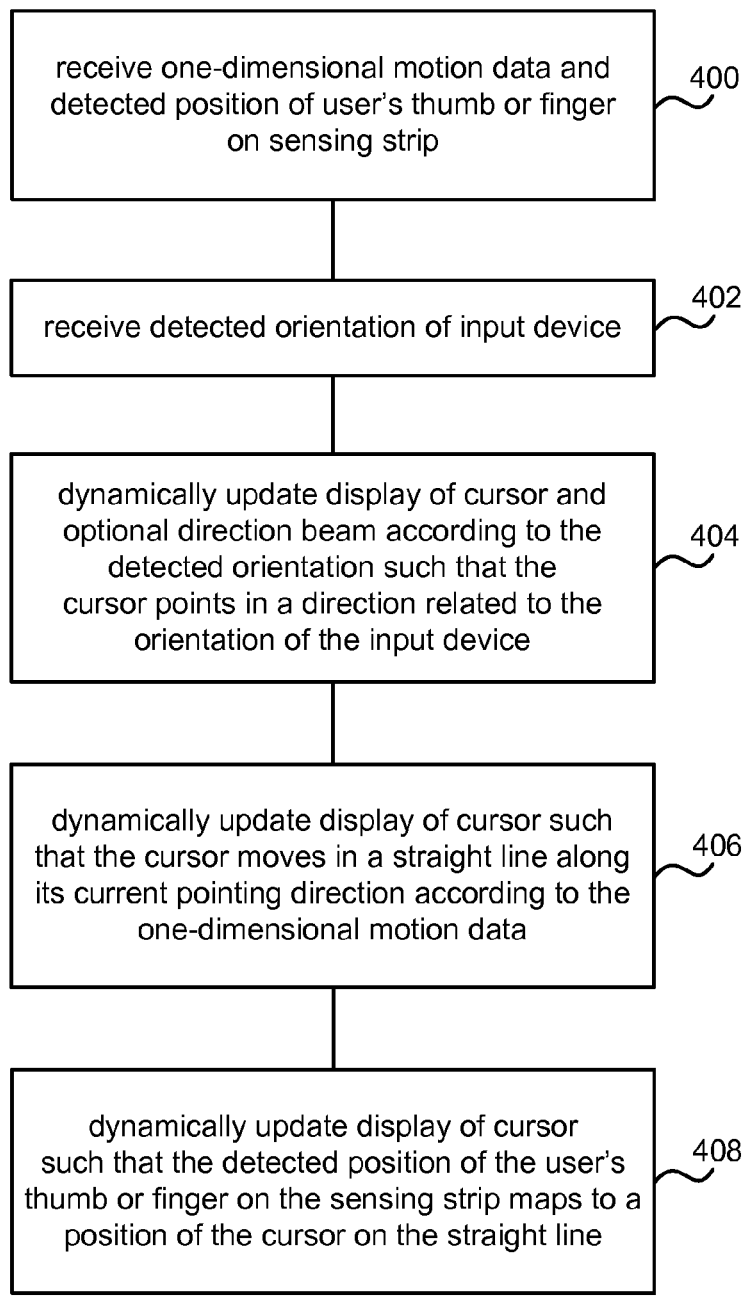
FIG. 4 is a flow diagram of a method at a master device for controlling movement and position of a cursor.

FIG. 4 is a flow diagram of a method at the master device whereby the movement and position of a cursor at a graphical user interface is controlled using the one-dimensional input from the user input device. Similar functionality is achieved as compared with a conventional computer mouse but there is no need to detect two-dimensional movement relative to a supporting surface. In contrast, only one-dimensional movement is detected relative to a sensing strip on the user input device itself.

One dimensional motion data is received 400 from the user input device together with detected position of a user's thumb or finger on the sensing strip. The orientation of the input device is received 402 from the user input device. As described above the orientation may be detected using an accelerometer, compass or other appropriate sensor. The orientation of the user input device is communicated to the master input device and the display of the cursor is dynamically updated 404 according to the detected orientation such that the cursor points in a direction related to the orientation of the input device. For example the cursor may initially point towards the top centre of the display device, if the user rotates the user interface device to an angle of 45° to the left then the position of the cursor is automatically updated such that it points toward the top left corner of the display screen. In another example the user may tilt the device in order to change the cursor position. For example if the cursor is in the centre of the screen the user may tilt the device 90° to the left to move the cursor to the left side of the screen.

An optional direction beam at the graphical user interface can also be dynamically updated. For example if the direction beam initially displayed indicated that input to the sensing strip would move the cursor in a straight line between the top centre of the screen and the bottom centre of the screen, if the user interface device was rotated 45° to the left then the direction beam may be dynamically updated to indicate that input to the sensing strip would move the cursor in a line between the top left corner of the screen and the bottom right corner of the screen.

The display of the cursor is dynamically updated 406 such that the cursor moves in a straight line along its current pointing direction according to the one dimensional motion data. For example if the cursor is in the centre of the screen and the user moves their thumb from the centre of the sensing strip forwards halfway along the sensing strip the cursor position may be dynamically updated such that it is now positioned halfway between the centre and the top of the screen.

In an example the user may slide their thumb along the strip and the position of the cursor is updated dynamically such that it corresponds with the position of the user's thumb on the strip at any given time. In another example the user may reposition their thumb from the centre of the strip to another position by lifting their thumb off the strip and placing it at a second position on the strip. In this example the cursor may disappear from the centre of the screen and reappear at a new position 408 corresponding to the second position of the users thumb.

In an example a user may wish to select an item using the cursor. The user may manipulate the cursor as described above until the cursor is in close proximity or over an item displayed at the GUI, the item may change color or otherwise be highlighted to show this and when the cursor is in proximity to the GUI the user can select the item by activating the switch.

Figure 5:
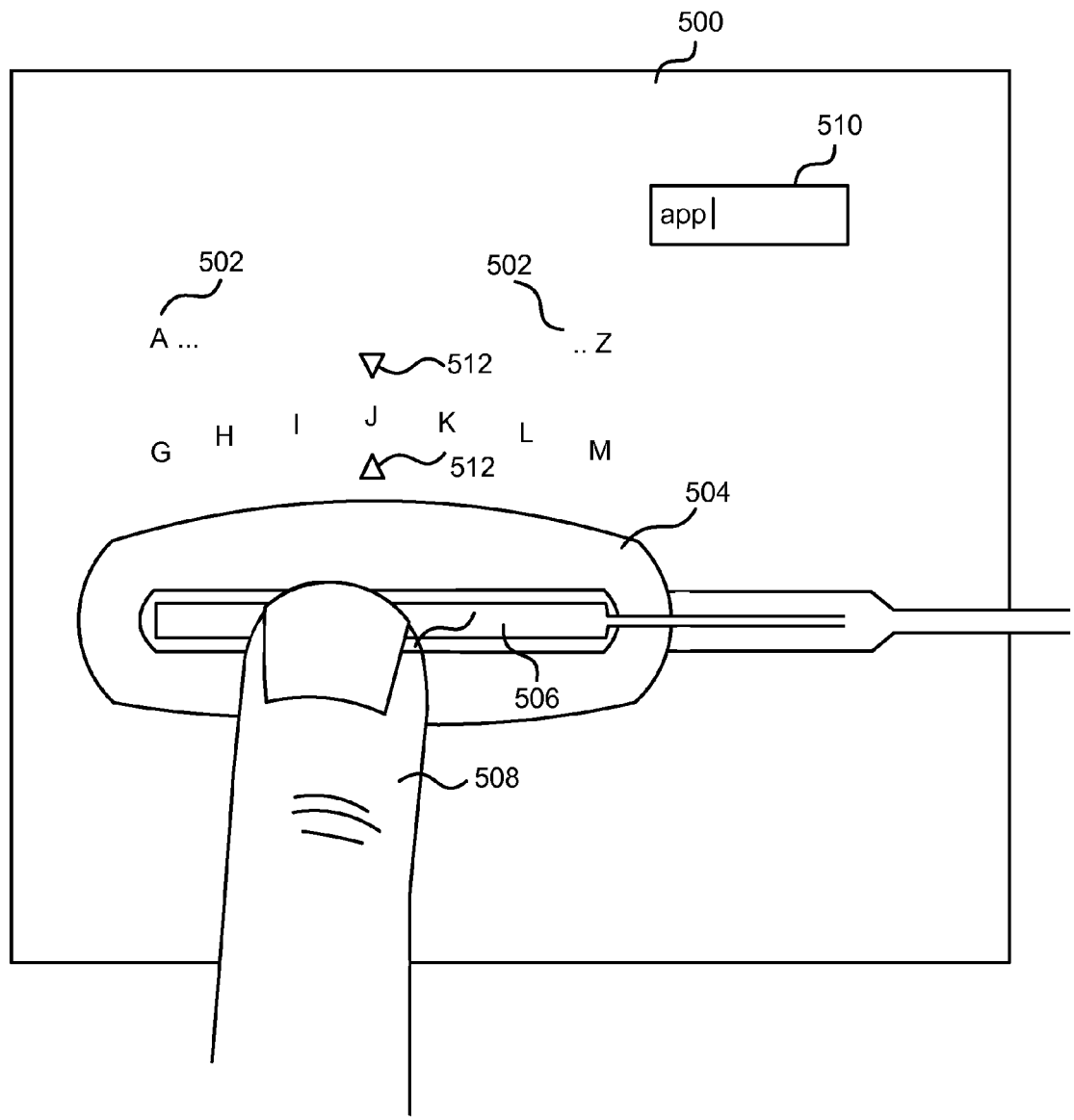
FIG. 5 shows an example user input device being used for inputting text at a master device.

FIG. 5 is a schematic diagram of an example of text input at a user interface using the user input device. A graphical user interface is displayed on the display screen 500. The start and end of the alphabet is represented by the letters "A" and "Z" 502 on the graphical user interface. The user can jump to the start or end portion of the alphabet by moving their finger or thumb 508 to a first or second end of the sensing strip 506 of the user input device 504. In an example the letters previously input by the user are shown in a text box 510. The letter which corresponds to the position of the user's finger on the sensing strip can be highlighted. For example the position of the user's finger may be represented by a pointer or indicator 512 at the graphical user interface. In other examples the letter may be highlighted or enlarged.

In an embodiment the entire alphabet may be initially displayed. The user may move their finger to a position on the sensing strip representing the position of the letter they wish to select and select the letter by activating the switch, tapping on the sensing strip, tilting or rotating the device or other appropriate means. In another example the position of the user's finger on the sensing strip may correspond to an approximate region of the alphabet, the user then selects that portion of the alphabet and the user interface zooms in on that portion allowing the user to select a letter with greater control. In another embodiment the user may select a first letter and the interface will present the user with a subset of letters which are most likely to follow the first letter. For example the letters which are most likely to follow the first letter may displayed in larger type or closer to the centre of the screen than letters which are less likely to follow a first letter.

Figure 6:
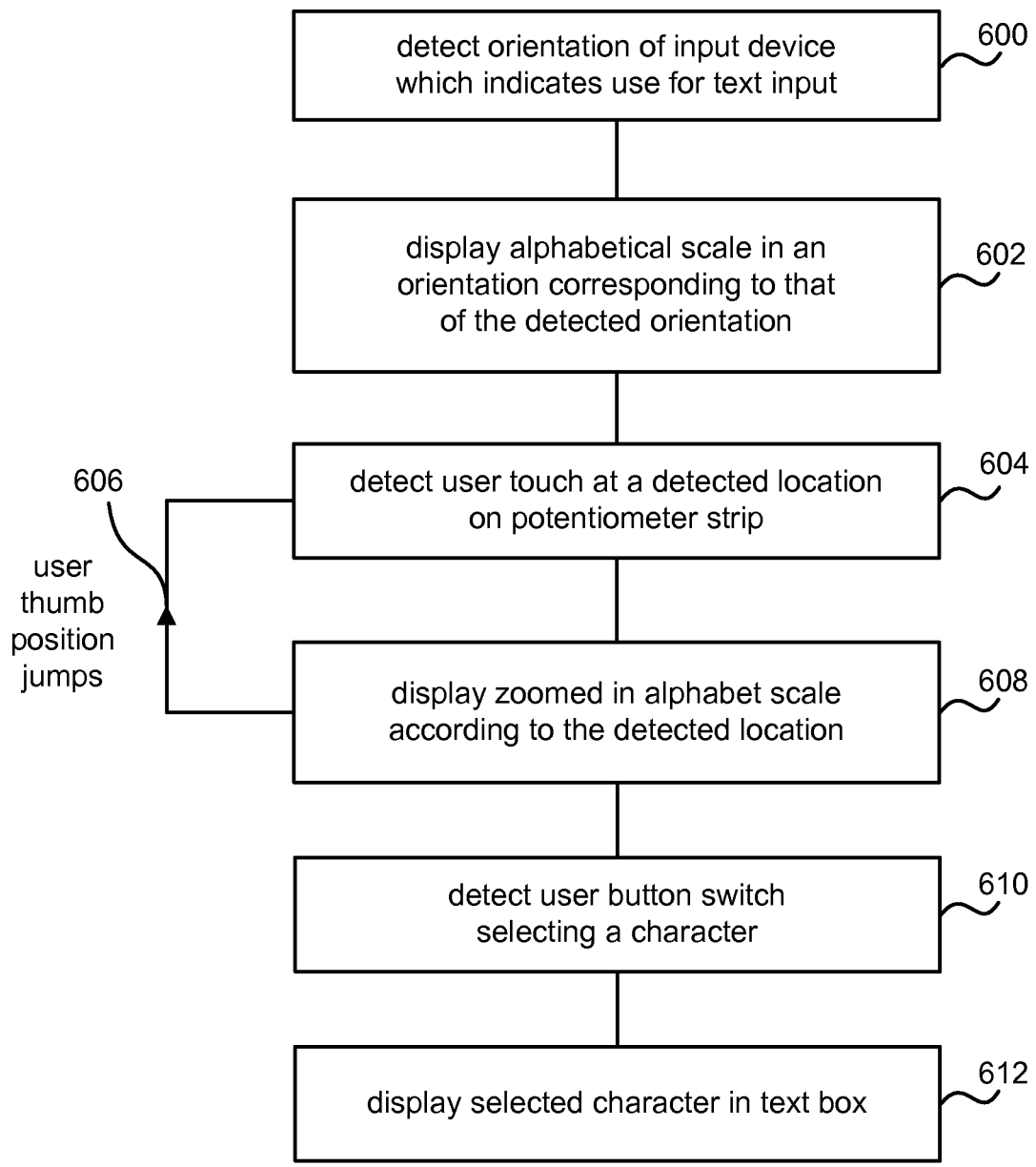
FIG. 6 is a flow diagram of a method at a master device for text input.

FIG. 6 is a flow diagram of an example method of utilizing the user input device for text input. The orientation of the input device is detected 600, the orientation may indicate that the device is to be used for text input. For example if a user holds the device in a horizontal position this may activate the text input interface. In other examples different activation signals may be used. For example the user may hold the device vertically, shake the device or use any other appropriate means of activating the appropriate interface.

An alphabetical scale is displayed 602 at the graphical user interface in an orientation corresponding to that of the detected orientation. An example of an alphabetical scale was described with reference to FIG. 5. However, other types of alphabetical scale could be used. The user's touch is detected 604 at a location on the sensing strip and the alphabetical scale is displayed zoomed in 608 according to the detected location of the user touch. For example if the user's thumb position was close to the centre of the sensing strip then centre of the alphabet is displayed zoomed in. However, if the user moves their thumb along the strip to a different location a different portion of the alphabet may be displayed. In an example the alphabet scale may keep automatically scrolling through the letters by looping through the alphabet until a letter is selected so that the user does not reach the end of the strip without having reached the desired letter.

Alternatively or additionally the user's thumb position may jump 606 from one position on the strip to another. For example if the user removes their thumb from the centre of the strip and then replaces it at the start of the strip then the display may change from displaying a portion of the centre of the alphabet to displaying a portion at the start of the alphabet. In other examples the mode of operation of the input device may change between user input events. For example, a first user input event may occur when a position on the alphabet scale is selected by a first touch by the user on the strip and second or subsequent user input events such as touches may move the position on the alphabet scale up or down by a single letter until a letter is selected. In a further example the manner of the user input may be configurable by the user.

A character is selected 610 by activating the switch. For example the character corresponding to the position of the user's finger or thumb on the sensing strip may be highlighted as described with reference to FIG. 5 and when the appropriate character is highlighted then the user may press or otherwise activate a switch in order to select that character.

The selected character can be displayed 612 in the text box. In an example only one character is displayed, for example the previously selected character. In another example all previously selected characters are displayed so that the user is able to see all the text that they have created. In another example gesture interactions or combinations of gestures and one-dimensional input to the sensing strip can be used to input text. For example flicking or rotating the device left may input a backspace and flicking or rotating the device right may input a space. It is also possible to detect rolling motion of the device, for example, using the orientation sensor to detect tilting of the device. Other gesture inputs may also be recognized, for example rotating the object up may cause the user interface to be reconfigured from lower-case letters to upper-case letters and conversely rotating the device down may reconfigure the user interface from upper-case letters to lower-case letters.

Figure 7:
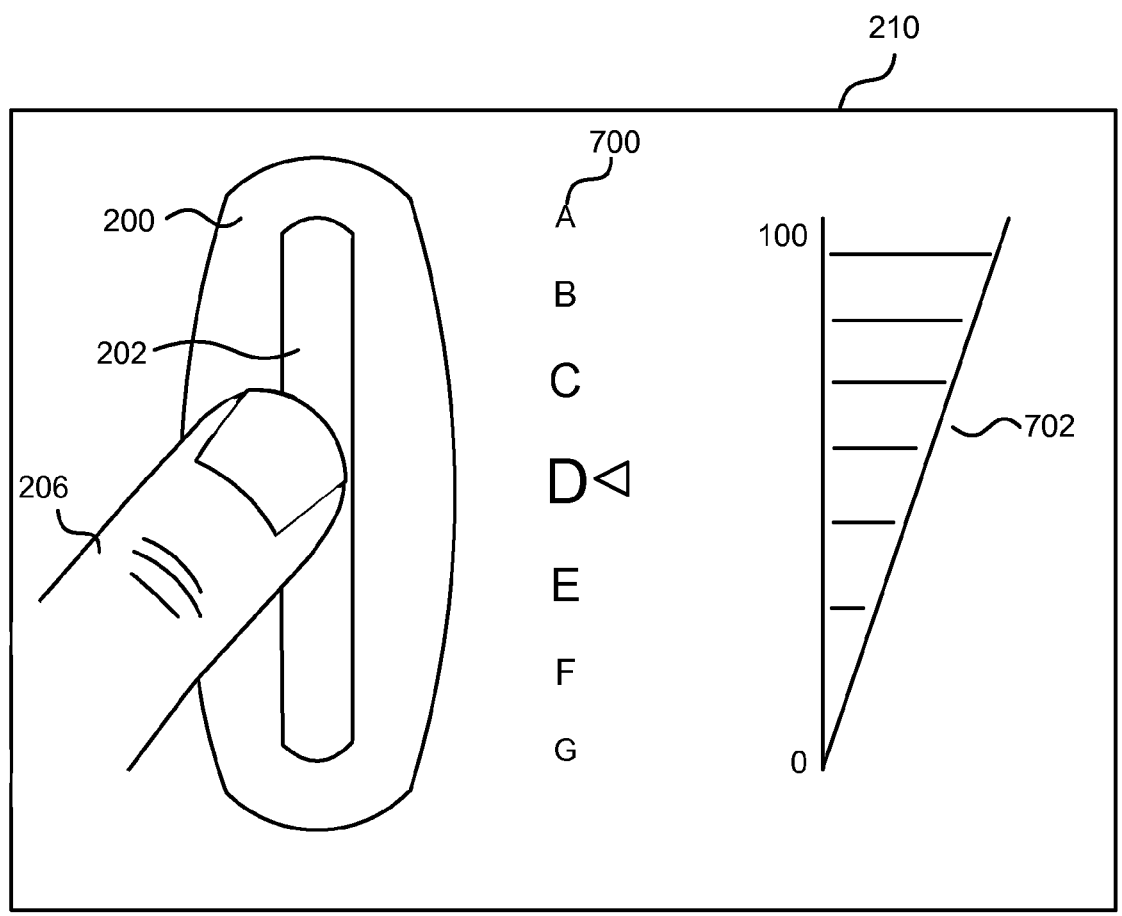
FIG. 7 shows an example user input device being used for text input or volume control.

FIG. 7 is a schematic diagram of another example of input at the user interface using the user input device. A display screen 210 of a master device is shown. As described above with reference to FIG. 2 the user input device comprises a housing 200 which contains a sensing strip 202. Input to the device is provided by the user's finger or thumb 206 sliding longitudinally along the surface of the sensing strip 202. In this example the user input device is held vertically and the alphabet 700 is displayed on the display screen in the same orientation. In this example the letter which corresponds to the position of the user's finger or thumb on the sensing strip is enlarged relative to the other letters. In an example the size of the letters may be graduated such that letters which closely correspond to the location of the user's finger on the sensing strip are larger than those which correspond less closely.

In another example the user input device may be used to control an aspect of the master device operation using a control scale 702. A non-limiting list of examples of controls is: a volume control, a brightness control, a contrast control, audio balance.

Figure 8:
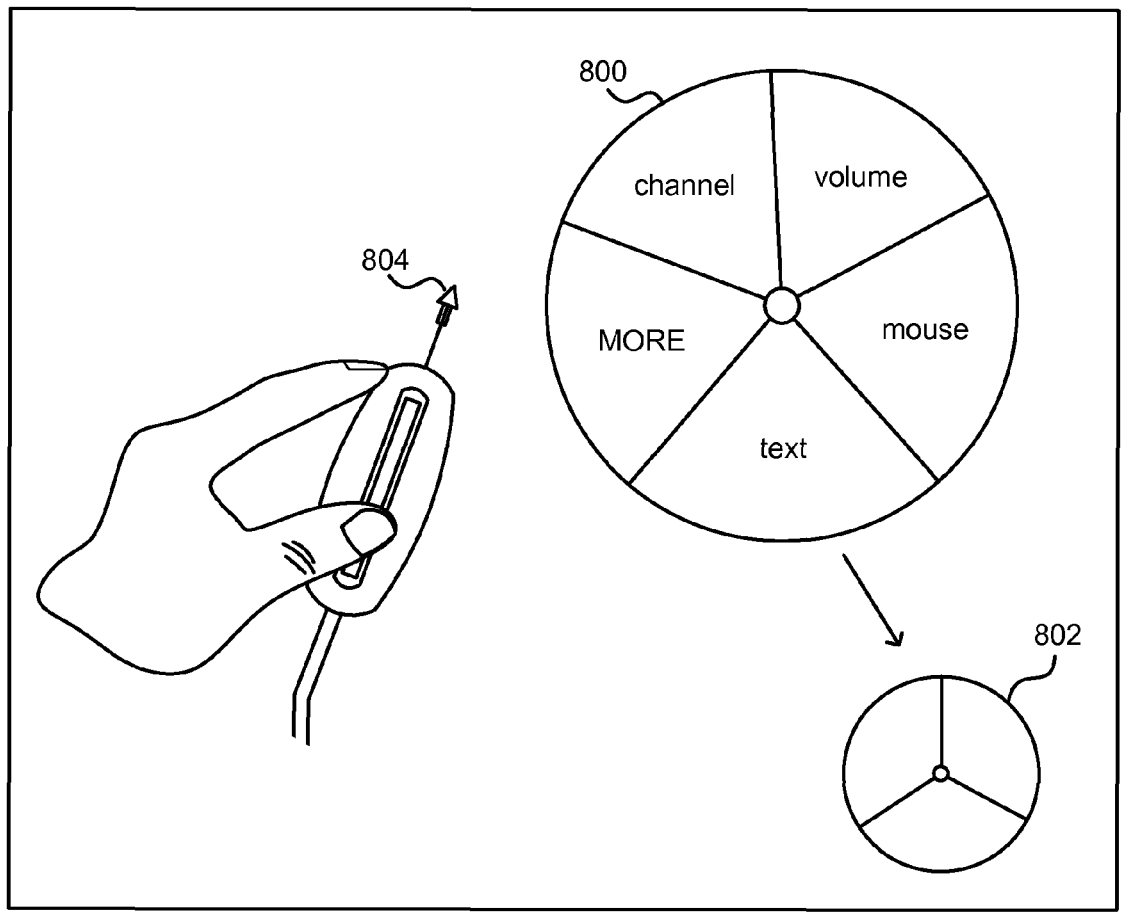
FIG. 8 shows an example user input device being used for menu selection at a master device.

FIG. 8 is a schematic diagram of an example of using the user input device to operate a menu system. In an example the menu system is circular and each menu option is represented as a sector of the circle. In an example a user may manipulate the menu system by operating a cursor 804 as described above with reference to FIG. 4 in order to select portions of the menu 800. When a portion of the menu 800 is selected this may cause a sub-menu 802 to be displayed. In an example there are a plurality of submenus. For example the user may select the option channel from the menu 800, a further submenu 802 displaying the channel numbers may replace the first menu at the display. In another example the submenu does not replace the first menu but instead appears as a further circle on the display screen. In other examples the menus may not be circular but may be any other appropriate shape.

Figure 9:
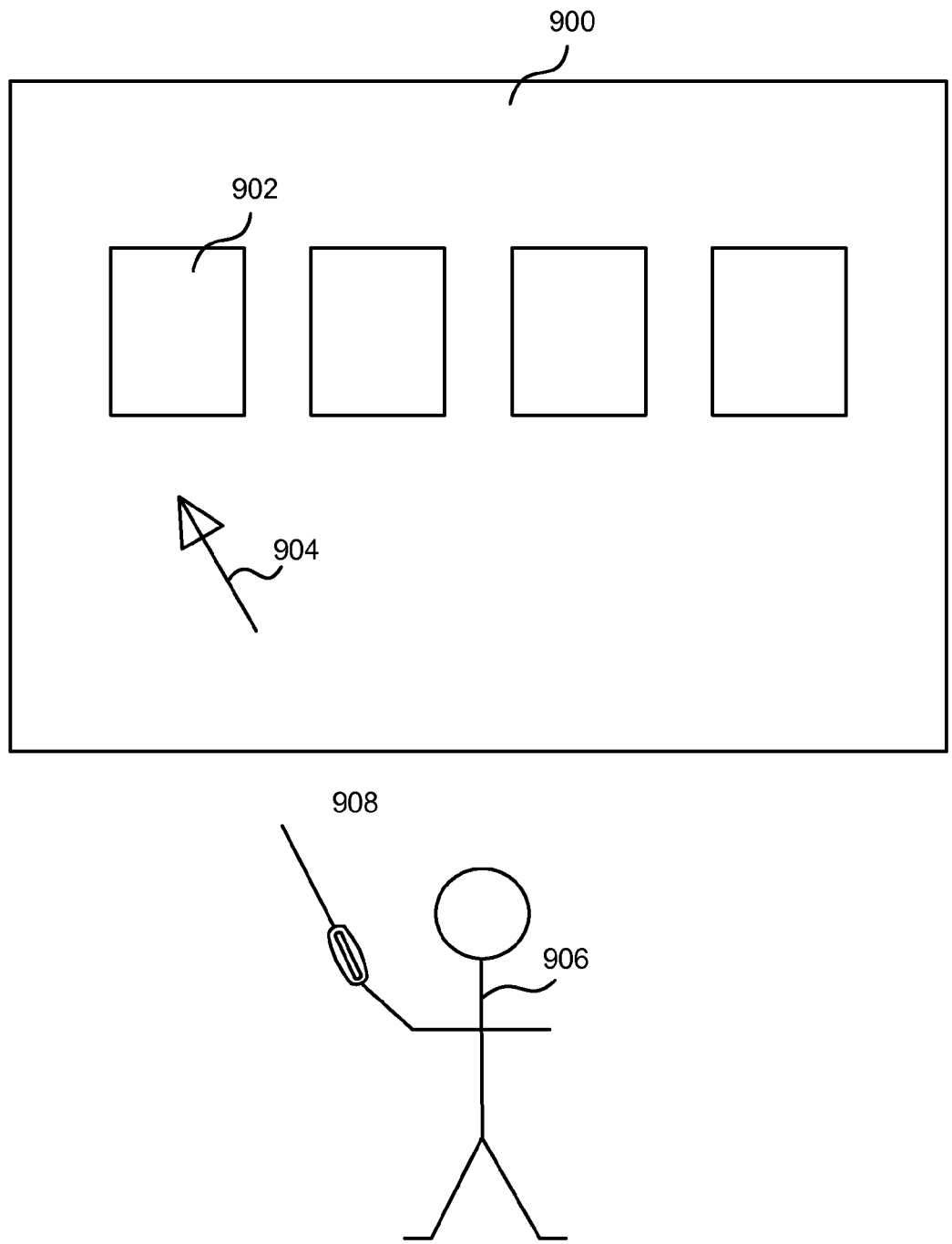
FIG. 9 shows an example user input device being used for item selection at a master device.

FIG. 9 is a schematic diagram of another example menu system. The different menu options are displayed as icons 902 on the display device 900. In an example the icons are a plurality of sub windows. The sub-windows may represent in a non-exhaustive list of examples: different software, different documents, photos, media items or a combination thereof. In an example items which have previously been selected by the user may be displayed in the window or in a sub-window as an item list. In an example the icons may be in the form of tiles or panes or may be tabs to enable the user to switch between documents. In an example a user may manipulate the menu system by operating a cursor 904 as described above with reference to FIG. 4. In another example the menu system may be navigated by scrolling with the position in the menu system corresponding to the position of the user's finger or thumb on the sensing strip. A user may select an item in the menu by activating a switch as described above. In another example the user may step forwards or backwards through the menu by moving the user input device, for example to step forwards through the menu they may tilt the device forwards and to step backwards through the menu they may tilt the device backwards.

Figure 10:
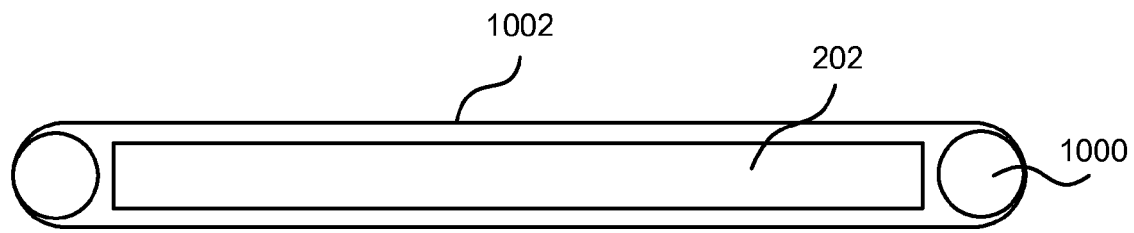
FIG. 10 is a schematic side view of a sensing strip for use in a user input device.

FIG. 10 is a side view of a sensing strip 202 around which a belt 1002 of flexible material is supported by two axles 1000. The flexible material may be made of plastic, rubber, latex or other material which enables the sensing strip 202 to detect the presence of a user's finger or thumb pressing the belt onto the sensing strip 202. As a user presses the belt onto the strip and slides his or her finger or thumb along the sensing strip 202 the user receives haptic feedback. This is because the user feels motion of the flexible strip which may be textured for example. This type of sensing strip may be used in any of the user input devices described herein.

Figure 11:
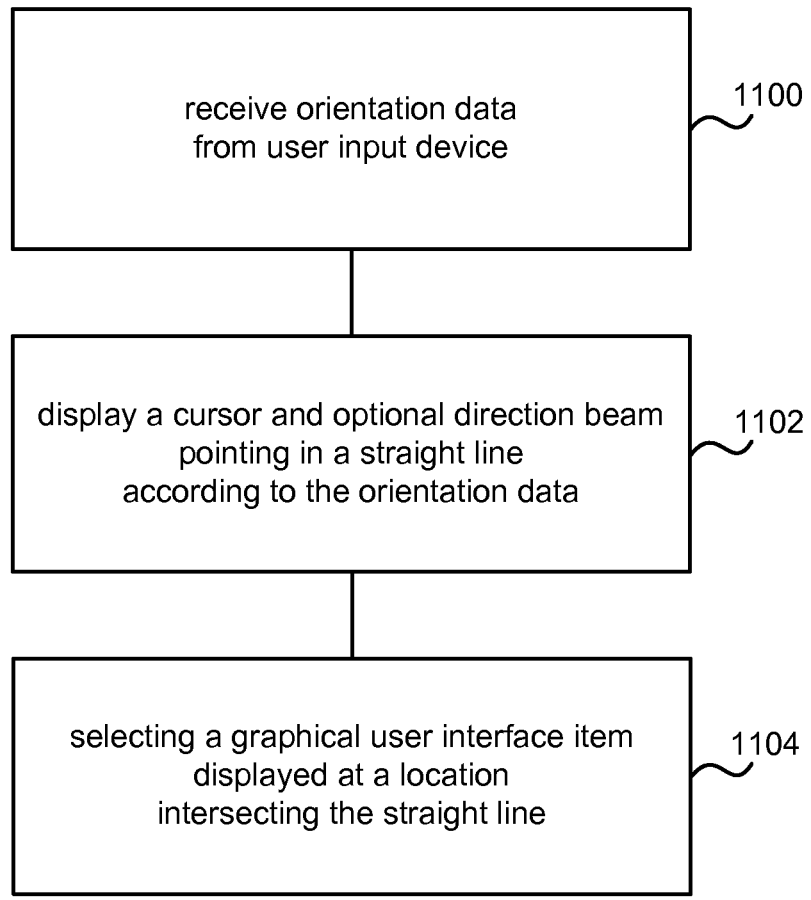
FIG. 11 is a flow diagram of a method at a master device for selecting graphical user interface items.

FIG. 11 is a flow diagram of a method at a master device for selecting a graphical user interface item such as a menu item or other graphical user interface item. Orientation data is received 1100 from the user input device as described above and the master device displays 1102 a cursor an optional direction beam pointing in a straight line according to the orientation data. The master device selects 1104 a graphical user interface item which is displayed at a location intersecting the straight line.

Figure 12:
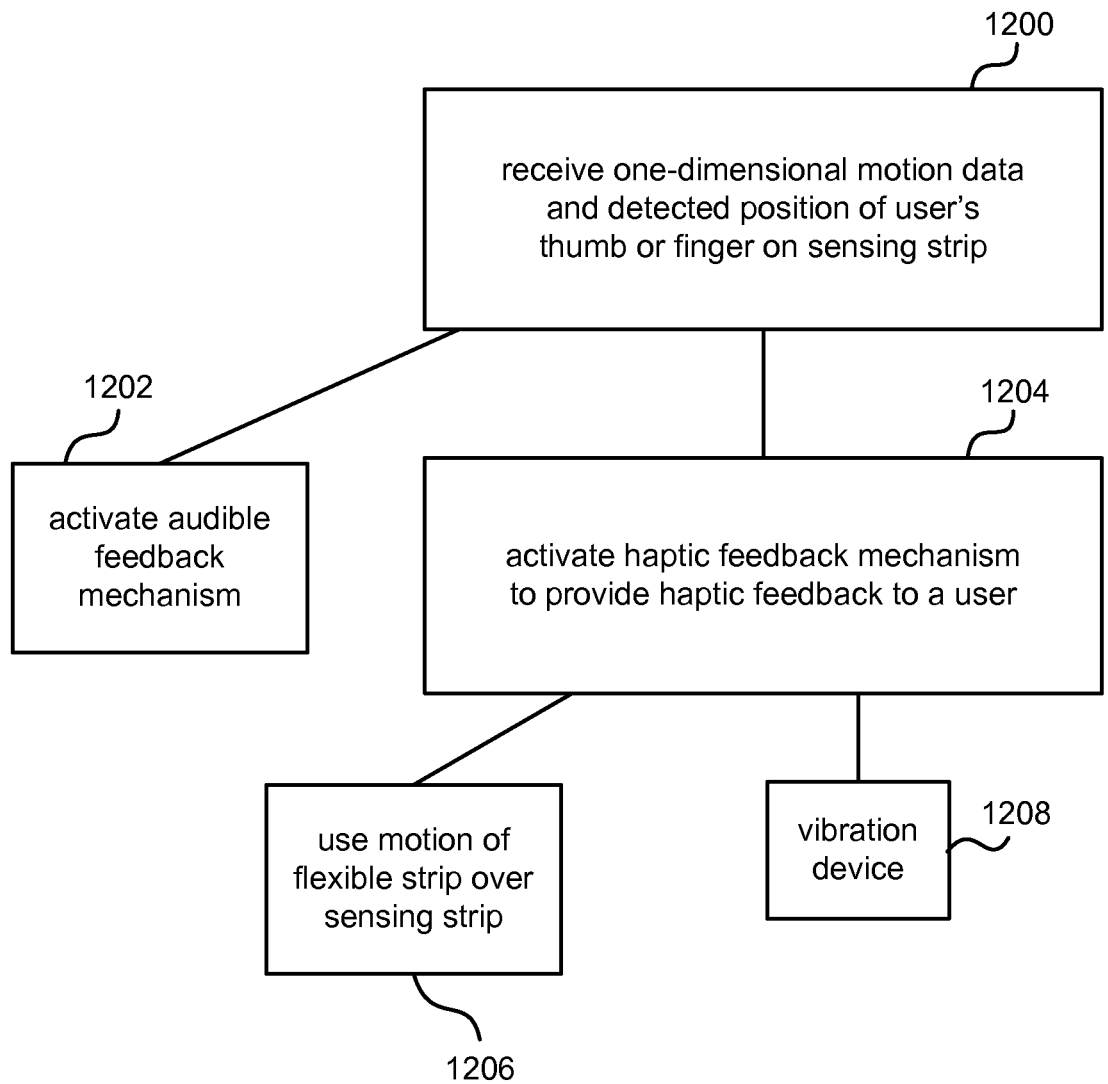
FIG. 12 is a flow diagram of a method at a user input device for providing haptic and/or audible feedback.

FIG. 12 is a flow diagram of a method at a user input device and/or master device. One dimensional motion data is detected 1200 as well as position of a user's thumb or finger on a sensing strip of the user input device. An audible feedback mechanism may be activated 1202 to let the user know that his or her input is being received successfully. A haptic feedback mechanism may be activated 1204. For example, this may be provided by motion 1206 of a flexible strip over the sensing strip. It may also be provided by a vibration device 1208 in the user input device.

Figure 13:
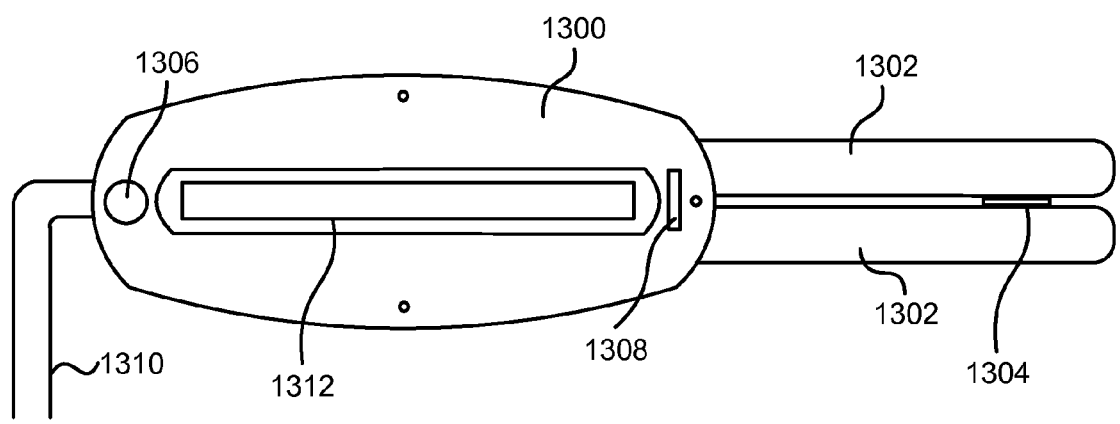
FIG. 13 is plan view of an example user input device having a switch held between two handle elements.

FIG. 13 is a plan view of an example embodiment of the user input device. A housing 1300 supports a sensing strip 1312 as well as a camera 1306 and microphone 1308. Extending from the housing is a handle comprising two parallel handle elements 1302 between which a switch 1304 is held. The handle elements may be squeezed together to activate the switch 1304. In this example the user input device has a wired connection 1310 to a master device although this is not essential. Any suitable type of connection may be used.

Figure 14:
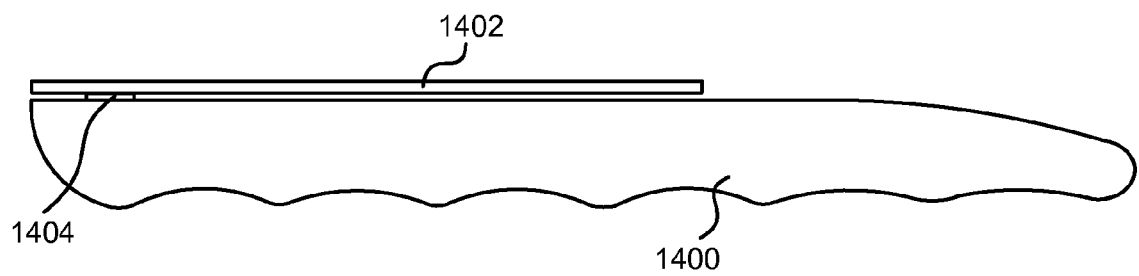
FIG. 14 is a side view of an example user input device having a handle with finger grips.

FIG. 14 is a side view of an example user input device. A housing 1400 supports a sensing strip 1402 and a switch 1404 is held between the sensing strip and the housing. The housing is shaped to provide a finger grip and extends away from the sensing strip to provide a handle.

Figure 15:
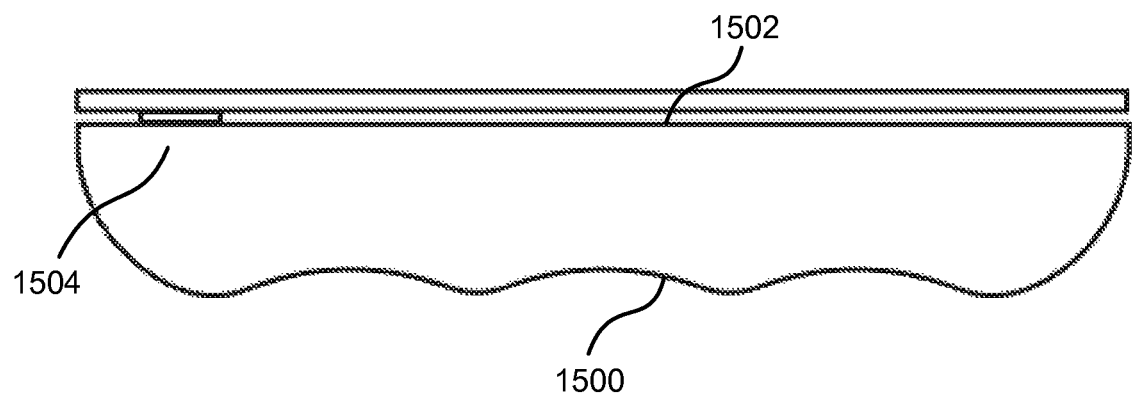
FIG. 15 is a side view of another example user input device.

FIG. 15 is a side view of another example user input device. In this case the housing 1500 and sensing strip 1502 are approximately the same length, a switch 1504 is optionally provided between the sensing strip and the housing and the housing is shaped to provide a finger grip on its underside. The switch may be activated by depressing the sensing strip.

Figure 16:
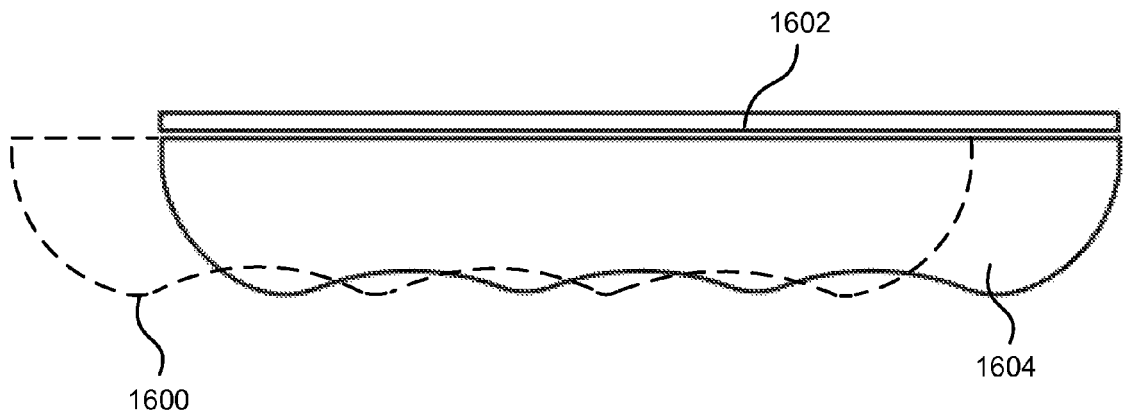
FIG. 16 is a side view of an example user input device showing two positions of a handle.

FIG. 16 is a side view of another example user input device. In this case the housing 1604 is movably mounted with respect to the sensing strip 1602. The housing may be slid to a position 1600 indicated by the dotted lines in the figure in order to activate a switch.

Figure 17:
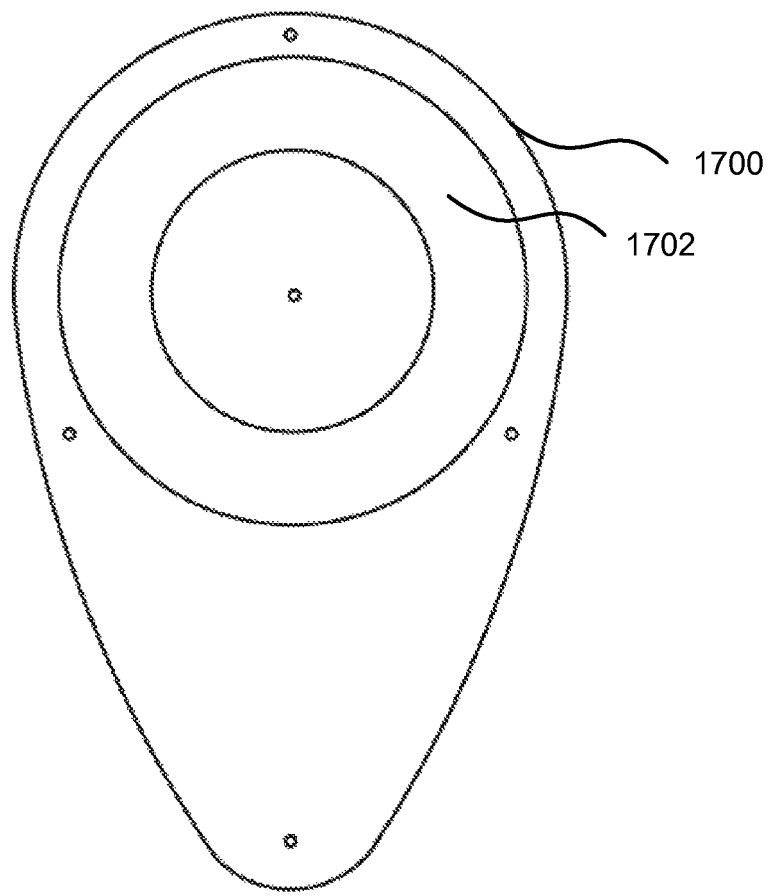
FIG. 17 is a plan view of a user input device with a circular sensing strip.

FIG. 17 is a plan view of an example user input device having a circular sensing strip 1702 supported by a housing 1700 that is substantially egg shaped in plan view.

Figure 18:
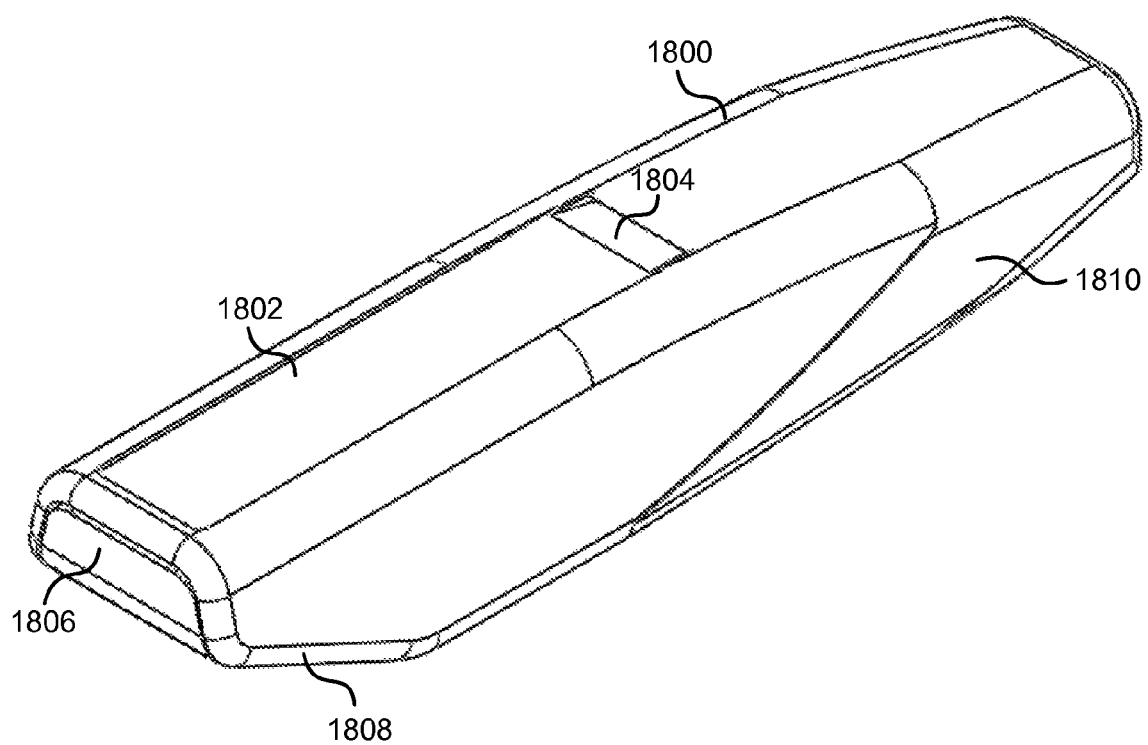
FIG. 18 is a perspective view of a user input device housing omitting the sensing strip.

FIG. 18 is a perspective view of an example housing for a user input device with the sensing strip omitted for clarity. One end 1810 of the housing is sized and shaped to act as a handle to be held in the palm of a user's hand. Another portion of the housing 1806 provides a region for outputting a wireless or infra red signal to a master device. A region 1808 of the housing provides a switch which may be depressed to make a user selection. An upper surface 1802 of the housing is sized and shaped to support a sensing strip and an entry hole 1804 is provided in the housing where one end of the sensing strip may enter the housing to be connected to electronics held in the housing.

Figure 19:
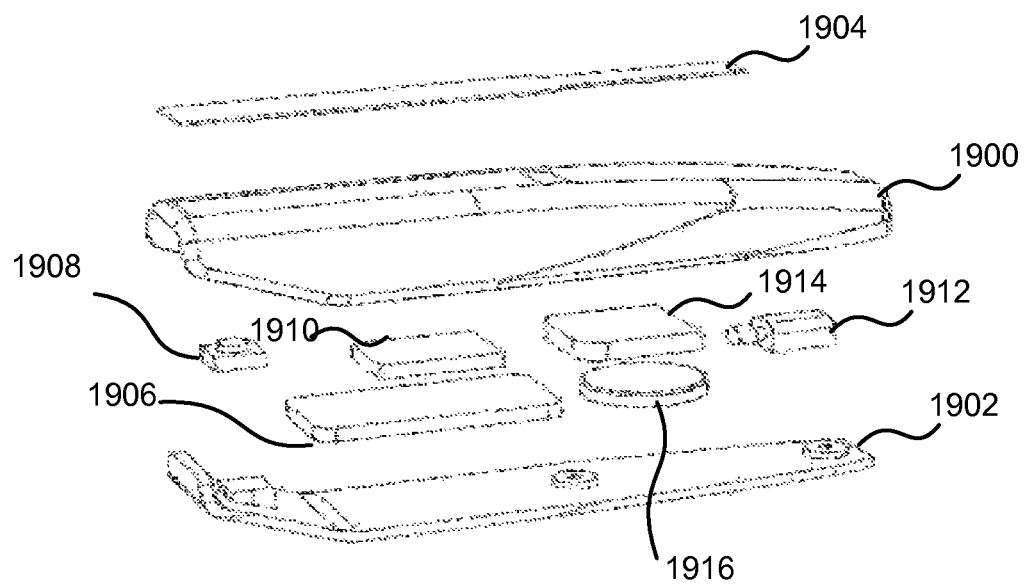
FIG. 19 is an exploded view of the user input device of FIG. 18 showing the sensing strip and electronics.

FIG. 19 shows the housing of FIG. 18 with the sensing strip and electronics visible in an exploded view. The housing comprises a top casing 1900 and a bottom casing 1902. The sensing strip 1904 is supported by the top casing 1900. The electronics contained within the housing comprise a processor 1906 (which may be an ASIC in some examples) for processing user input, a switch 1908 which may be used for selection as described herein, an orientation sensor 1910, for example a compass, which may detect the orientation of the device for user input and a haptic feedback control device 1912, for example a vibration motor. In an example the device additionally comprises a wireless input/output device 1914, for example a wireless or Bluetooth (trade mark) transmitter, and a battery 1916 so that the device can operate wirelessly. In other embodiments power supply and device input/output may be via a wired connection.

Figure 20:
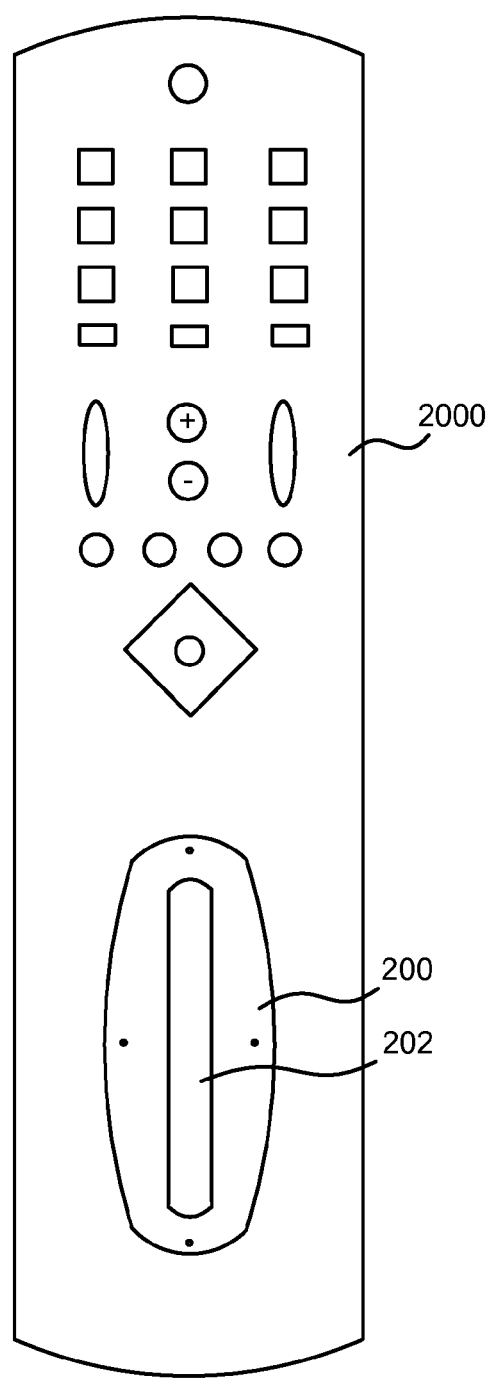
FIG. 20 is a plan view of a user input device incorporated in a television remote control.

FIG. 20 is a plan view of a television remote control 2000 incorporating a user input device 200 having a sensing strip 202 as described herein. The user input device 200 may have any suitable form for detecting one dimensional user input.

Figure 21:
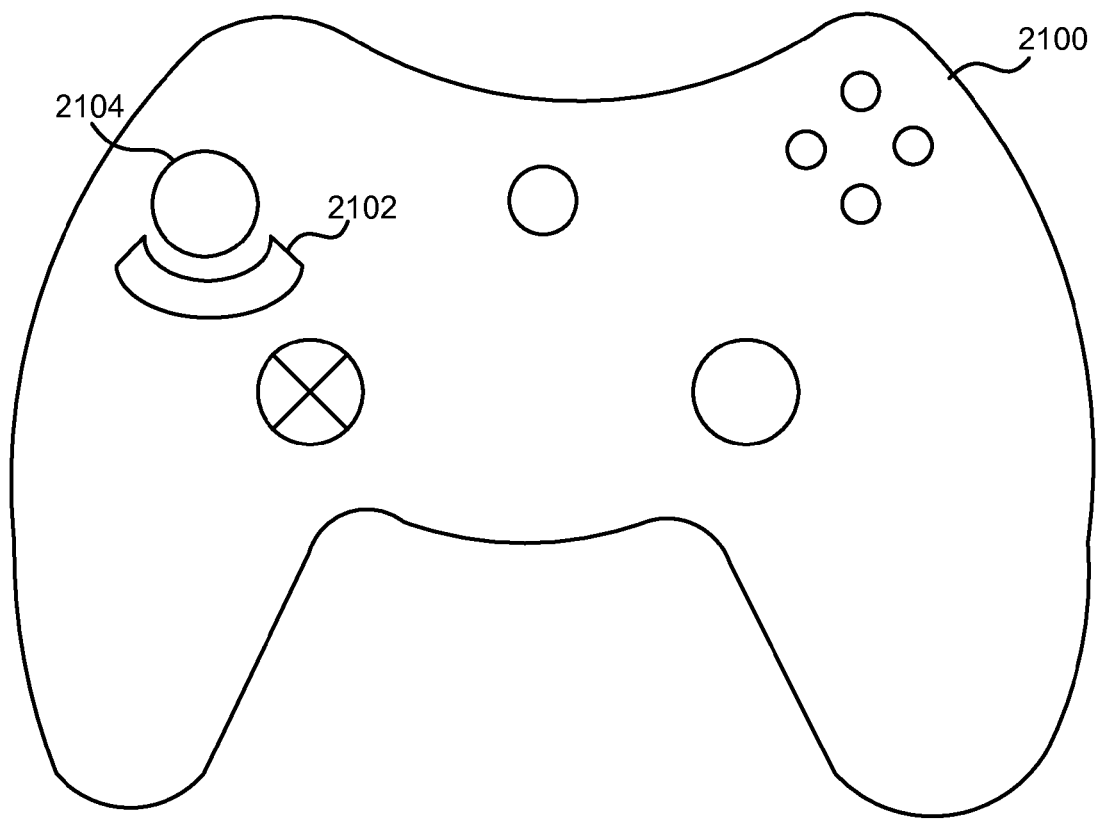
FIG. 21 is a plan view of a user input device incorporated in a video game controller.

FIG. 21 is a plan view of a video game controller 2100 incorporating a user input device 2102 having a sensing strip as described herein which is semi-circular in shape. The user input device 2102 may have any suitable form for detecting one-dimensional user input. In this example the sensing strip 2102 is located adjacent a joystick 2104. In this way a user may operate the sensing strip 2102 rather than the joystick to input text for example.

Figure 22:
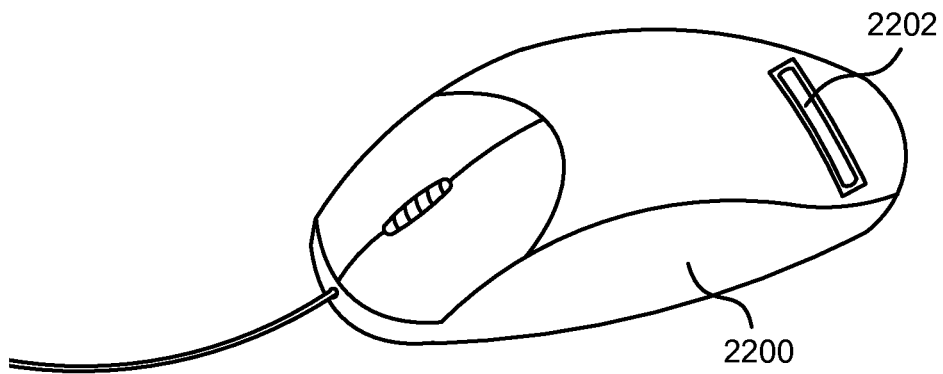
FIG. 22 is a perspective view of a user input device incorporated in a computer mouse.

FIG. 22 is a perspective view of a computer mouse 2200 incorporating a user input device 2202 having a sensing strip as described herein. The user input device may have any suitable form for detecting one-dimensional user input.

Figure 23:
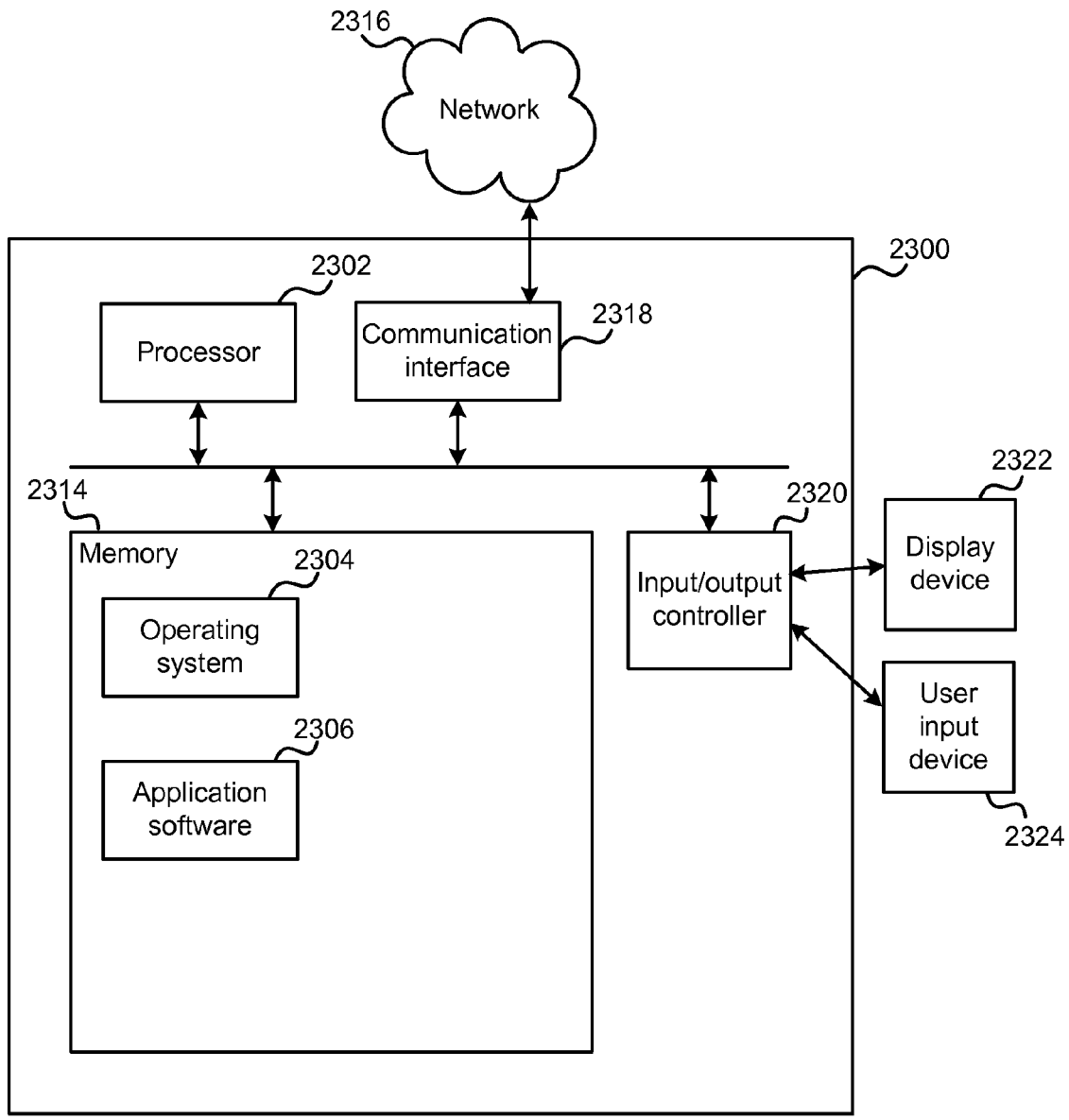
FIG. 23 illustrates an exemplary computing-based device in which embodiments of a user input device and/or a master device for use with a user input device may be implemented. Like reference numerals are used to designate like parts in the accompanying drawings.

FIG. 23 illustrates various components of an exemplary computing-based device 2300 which may be implemented as any form of a computing and/or electronic device, and in which embodiments of a master device or user input device may be implemented.

The computing-based device 2300 comprises communication interface 2318 arranged to receive communication from other entities over a communications network 2316 of any type. For example, the communication may be wireless communication from a one-dimensional user input device.

Computing-based device 2300 also comprises one or more processors 2302 which may be microprocessors, controllers or any other suitable type of processors for processing computing executable instructions to control the operation of the device in order to control a graphical user interface (in the case that the computing device is a master device); or to control a user input device .... Platform software comprising an operating system 2304 or any other suitable platform software may be provided at the computing-based device to enable application software 2306 to be executed on the device. For example, the master device may be a personal computer having an operating system and application software. In the case that the computing device 2300 is the user input device the operating system and application software may be omitted.

The computer executable instructions may be provided using any computer-readable media that is accessible by computing based device 2300. Computer-readable media may include, for example, computer storage media such as memory 2314 and communications media. Computer storage media, such as memory 2314, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 2314) is shown within the computing-based device 2300 it will be appreciated that the storage may be distributed or located remotely and accessed via a network or other communication link (e.g. using communication interface 2318).

The computing-based device 2300 also comprises an input/output controller 2320 arranged to output display information to a display device 2322 which may be separate from or integral to the computing-based device 2300. The display information may provide a graphical user interface. The input/output controller 2320 is also arranged to receive and process input from one or more devices, such as a user input device 2324 (e.g. a mouse or a keyboard or a user input device as described herein). This user input may be used to control a graphical user interface. The input/output controller 2320 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A hand-held user input device comprising:
   a sensing strip arranged to detect one-dimensional motion of a user's thumb or finger relative to the strip and to detect position of a user's thumb or finger on the strip in use; the sensing strip being sized and shaped such that a user's thumb or finger may slide along the strip in use;
   a housing supporting the sensing strip and sized and shaped to be held in a user's hand in use;
   a processor supported in the housing and arranged to receive sensed data from the sensing strip and to control a communication unit supported in the housing;
   the communication unit being connected to the processor and arranged to send the sensed data to a master device in order to control movement and position of a cursor at a user interface of the master device in use, the user interface displaying the cursor and a direction beam extending at least forward from the cursor in a direction associated with the orientation of the input device, forward being the direction toward which the cursor is pointed.

2. A device as claimed in claim 1 wherein the sensing strip is a capacitive strip over which an electrical potential difference is applied and wherein changes in the electrical potential difference are monitored according to position and movement of a user's thumb or finger along the sensing strip in use.

3. A device as claimed in claim 1 wherein the sensing strip is a potentiometer strip.

4. A user input device as claimed in claim 1 comprising at least one orientation sensor supported in the housing and wherein the communication unit is arranged to send output from the orientation sensor to the master device in order to control orientation of a cursor at a user interface of the master device in use.

5. A user input device as claimed in claim 1 comprising a switch supported by the housing and arranged to be pressed by the user and wherein the communication unit is arranged to send output from the switch to the master device in order to indicate a user selection at a user interface of the master device in use.

6. A user input device as claimed in claim 5 wherein the switch is supported by the housing by any of: being incorporated in a handle of the device, being under the sensing strip, being between the sensing strip and a handle of the device such that relative movement between the sensing strip and handle activates the switch.

7. A user input device as claimed in claim 1 wherein the sensing strip is approximately the same width as a human thumb.

8. A user input device as claimed in claim 1 wherein the sensing strip is circular or semi-circular.

9. A user input device as claimed in claim 1 comprising a haptic feedback mechanism arranged to provide haptic feedback to a user when a user slides a finger or thumb along the sensing strip in use.

10. A user input device as claimed in claim 1 comprising a video camera and a microphone and wherein the communication unit is arranged to transfer data from the video camera and the microphone to the master device such that the device may be used for video conferencing in conjunction with the master device.

11. A user input device as claimed in claim 1 arranged to enable a user to input text to the master device.

12. A method at a master device having a graphical user interface comprising:
   receiving data from a user input device, the data indicating one-dimensional motion of a user's thumb or finger relative to a sensing strip and the detected position of a user's thumb or finger on the sensing strip;
   receiving orientation data from the user input device indicating an orientation of the device;
   displaying a cursor at the graphical user interface such that it points in a direction related to the orientation data;
   displaying a direction beam extending at least forward from the cursor in the direction associated with the orientation of the input device, forward being the direction toward which the cursor is pointed;
   displaying the cursor at the graphical user interface such that the one-dimensional motion of the user's thumb or finger maps to motion of the cursor in a straight line extending from the cursor in its pointing direction and such that the detected position of the user's thumb or finger on the sensing strip maps to a position of the cursor which is on the straight line;
   receiving an instruction to display an alphabetical scale and, responsive to the instruction, displaying the alphabetical scale at an orientation associated with the orientation of the input device; and
   receiving motion data from the user input device, the motion data comprising at least one pre-defined gesture, and inserting at least one special character at the cursor location in response to receiving the motion data, the at least one special character being associated with the at least one pre-defined gesture.

13. A method as claimed in claim 12 which comprises displaying an alphabetical scale at the graphical user interface and displaying an indicator at a location on the scale selected according to the detected position of the user's thumb or finger on the sensing strip.

14. A method as claimed in claim 13 which comprises receiving user input selection data from the user input device and displaying a zoomed in alphabetical scale according to the user input selection.

15. A method as claimed in claim 14 comprising selecting the letter adjacent the indicator as input to a text box displayed at the graphical user interface.

16. A method at a master device having a graphical user interface comprising:
   receiving data from a user input device, the data indicating one-dimensional motion of a user's thumb or finger relative to a sensing strip and the detected position of a user's thumb or finger on the sensing strip;
   receiving orientation data from the user input device indicating an orientation of the user input device;
   receiving movement data from the user input device indicating movement of the user input device;
   displaying a cursor at the graphical user interface such that it points in a direction related to the orientation data;
   displaying a direction beam extending at least forward from the cursor in the direction associated with the orientation of the input device, forward being the direction toward which the cursor is pointed;
   displaying the cursor at the graphical user interface such that the one-dimensional motion of the user's thumb or finger maps to motion of the cursor in a straight line extending from the cursor in its pointing direction and such that the detected position of the user's thumb or finger on the sensing strip maps to a position of the cursor which is on the straight line; and
   in response to receiving movement data from the user input device, the movement data being associated with a user shaking the user input device, displaying an alphabetical scale at the graphical user interface, the orientation of the alphabetical scale being related to the orientation data, and displaying an indicator at a location on the scale selected according to the detected position of the user's thumb or finger on the sensing strip.

17. A method as claimed in claim 16 which comprises receiving user input selection data from the user input device and displaying a zoomed in alphabetical scale according to the user input selection.

18. A method as claimed in claim 16 comprising selecting the letter adjacent the indicator as input to a text box displayed at the graphical user interface.

* * * * *